US008800714B2

(12) United States Patent
Ichihashi

(10) Patent No.: US 8,800,714 B2
(45) Date of Patent: Aug. 12, 2014

(54) STRUCTURE WITH ACTIVE ACOUSTIC OPENINGS

(75) Inventor: Fumitaka Ichihashi, Chandler, AZ (US)

(73) Assignee: Hexcel Corporation, Dublin, CA (US)

( * ) Notice: Subject to any disclaimer, the term of this patent is extended or adjusted under 35 U.S.C. 154(b) by 2 days.

(21) Appl. No.: 13/533,668

(22) Filed: Jun. 26, 2012

(65) Prior Publication Data

US 2013/0341119 A1 Dec. 26, 2013

(51) Int. Cl.
*E04B 1/82* (2006.01)
*G10K 11/00* (2006.01)
*B32B 3/12* (2006.01)
*H04R 31/00* (2006.01)

(52) U.S. Cl.
USPC ............ 181/292; 181/207; 181/210; 181/286

(58) Field of Classification Search
USPC .......... 181/292, 207, 210, 214, 286; 428/116; 29/896.2
See application file for complete search history.

(56) References Cited

U.S. PATENT DOCUMENTS

| | | | | |
|---|---|---|---|---|
| 2,540,331 | A * | 2/1951 | Hlavaty | 454/185 |
| 3,952,831 | A * | 4/1976 | Bernard et al. | 181/292 |
| 4,111,081 | A * | 9/1978 | Hilliard et al. | 181/290 |
| 4,410,065 | A | 10/1983 | Harvey | |
| 4,421,201 | A * | 12/1983 | Nelsen et al. | 181/214 |
| 4,591,097 | A * | 5/1986 | Thayer | 239/265.29 |
| 5,785,919 | A * | 7/1998 | Wilson | 264/401 |
| 6,274,216 | B1 * | 8/2001 | Gonidec et al. | 428/116 |
| 6,371,242 | B1 * | 4/2002 | Wilson et al. | 181/292 |
| 6,536,556 | B2 * | 3/2003 | Porte et al. | 181/292 |
| 6,609,592 | B2 * | 8/2003 | Wilson | 181/292 |
| 2002/0036115 | A1 | 3/2002 | Wilson | |
| 2005/0178489 | A1 * | 8/2005 | Belleguic et al. | 156/64 |
| 2007/0256889 | A1 * | 11/2007 | Yu et al. | 181/214 |
| 2008/0020176 | A1 * | 1/2008 | Ayle | 428/118 |
| 2012/0037449 | A1 * | 2/2012 | Ayle | 181/292 |
| 2012/0156006 | A1 * | 6/2012 | Murray et al. | 415/119 |
| 2012/0285768 | A1 * | 11/2012 | Douglas et al. | 181/292 |
| 2013/0062143 | A1 * | 3/2013 | Ichihashi | 181/292 |

FOREIGN PATENT DOCUMENTS

| | | |
|---|---|---|
| WO | 01/43119 A1 | 6/2001 |

* cited by examiner

*Primary Examiner* — David Warren
*Assistant Examiner* — Christina Russell
(74) *Attorney, Agent, or Firm* — W. Mark Bielawski; David J. Oldenkamp

(57) ABSTRACT

An acoustic structure that includes a septum having an acoustic opening which defines an open area that varies in response to changes in the velocity of noise-containing media passing through the acoustic opening. The septum includes a fixed portion and one or more movable flapper portions wherein the fixed portion and/or the flapper portion(s) include surfaces that define an acoustic opening through the septum. The acoustic opening has an open area which varies due to movement of the movable flapper(s) in response to changes in velocity of the noise-containing media that passes through the acoustic opening. The resulting septum has a relatively low non-linearity factor (NLF).

19 Claims, 5 Drawing Sheets

FIG. 1
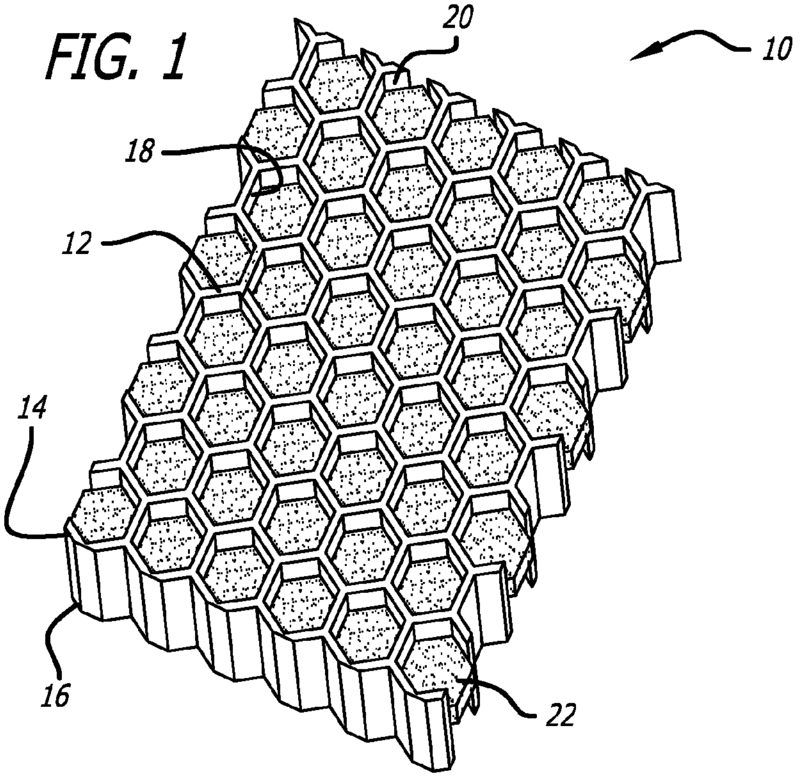
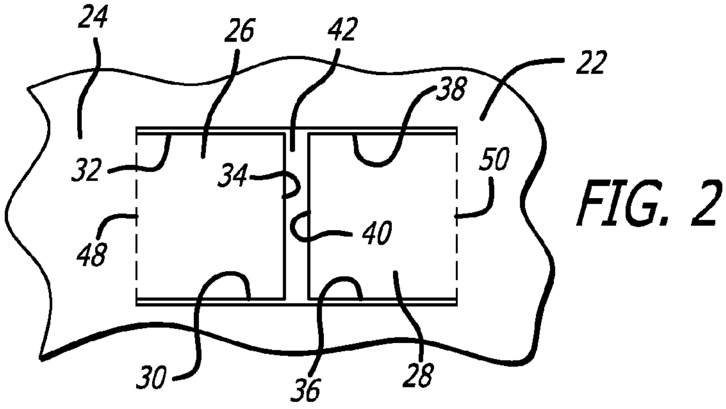
FIG. 2
FIG. 3
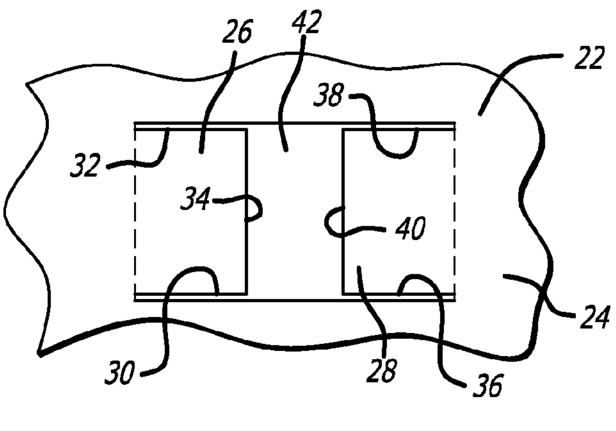

STRUCTURE WITH ACTIVE ACOUSTIC OPENINGS

BACKGROUND OF THE INVENTION

1. Field of the Invention

The present invention relates generally to acoustic structures that are used to attenuate noise. More particularly, the present invention is directed to providing acoustic septum material for use in acoustic structures to provide a relatively low non-linearity factor (NLF) for noise attenuation.

2. Description of Related Art

It is widely recognized that the best way of dealing with excess noise generated by a specific source is to treat the noise at the source. This is typically accomplished by adding acoustic damping structures (acoustic treatments) to the structure of the noise source. One particularly problematic noise source is the jet engine used on most passenger aircraft. Acoustic treatments are typically incorporated in the engine inlet, nacelle and exhaust structures. These acoustic treatments include acoustic resonators that contain relatively thin acoustic materials or grids that have millions of holes that create acoustic impedance to the sound energy generated by the engine.

Honeycomb has been a popular material for use in aircraft and aerospace vehicles because it is relatively strong and lightweight. For acoustic applications, such as engine nacelles, acoustic materials are added to the honeycomb structure so that the honeycomb cells are acoustically closed at the end located away from the engine and covered with a porous covering at the end located closest to the engine. The closing of the honeycomb cells with acoustic material in this manner creates an acoustic resonator that provides attenuation, dampening or suppression of the noise. Acoustic septums are also usually located within the interior of the honeycomb cells in order to provide the resonator with additional noise attenuation properties.

The materials used to form acoustic septums and other acoustic structures typically include numerous holes that are an essential part of the acoustic properties of the material. The holes are typically drilled mechanically or by using a laser. Once formed, the cross-sectional area of the holes remains constant. The inability to actively change size and/or shape of septum holes in response to changes in noise pressure and gas velocity presents certain problems with respect to noise sources, such as jet engines, where the velocity of air or gas emitted from the engine varies with engine speed and location.

Nonlinearity factor (NLF) is a standard measure of a septums ability to attenuate noise over a range of flow velocities. NLF is typically determined by measuring the flow resistance of the septum at a low flow rate (e.g. 20 cm/second) and a high flow rate (e.g. 200 cm/second). The ratio of the low flow rate resistance to the high flow rate resistance is the NLF. It is desirable that the NLF be as close to 1 as possible. An NLF of 1 means that the flow resistance and sound dampening capability of the septum material remains constant as the flow velocity of air or gas through the septum increases.

A popular septum material is fabric made from woven monofilaments of certain polymers, such as polyetheretherketone (PEEK). These types of woven fabric septums tend to have relatively low NLF's which are typically below 2. However, such woven monofilament PEEK septums are relatively expensive.

The less expensive drilled septum materials tend to have NLF's on the order of about 4 and more. It would be desirable to provide relatively inexpensive septums made from the same septum material as drilled septums, but where the openings are formed and oriented such that the NLF of the septum is comparable to woven monofilament septum material.

SUMMARY OF THE INVENTION

In accordance with the present invention, it was discovered that septum layers or films with relatively low NLF's are possible if the holes which are formed in the septum have cross-sectional areas that are able to vary actively in response to changes in the pressure and/or velocity of air or other noise-containing media that passes through the septum. This active variation in the cross-sectional area is achieved by providing movable tabs or flappers as part of the septum opening. It was discovered that the tabs or flappers automatically bend in response to changes in the velocity of the media flowing through the opening. Movement of the flapper(s) changes the cross-sectional area of the hole so that the cross-sectional area increases with increasing media velocity. This change in cross-sectional area, which is dependent upon the flow velocity of the media, was discovered to provide septum materials with NLF's that are substantially below those obtainable with standard septum material that includes fixed openings.

In accordance with the present invention, an acoustic structure is provided that includes a septum having an acoustic opening which defines an open area that varies in response to changes in the velocity of noise-containing media passing through the acoustic opening. The septum includes a fixed portion and one or more movable flapper portions wherein the fixed portion and/or the flapper portion(s) include surfaces that define an acoustic opening through the septum. The acoustic opening has an open area which varies due to movement of the movable flapper(s) in response to changes in velocity of the air or other noise-containing media that passes through the acoustic opening.

As a feature of the invention, the movable flapper portion is hinged to the fixed portion of the septum by way of a fold line in the septum that defines the transition between the fixed portion of the septum and the flapper portion. The opening may include a plurality of flapper portions or the opening may include a single flapper portion depending upon acoustic attenuation requirements and other design considerations.

The present invention is particularly well-suited for providing a relatively low cost sound dampening septum material where a low NLF is desired. Such low NLF materials are useful in dampening noise from a jet engine or other noise source where the velocity of the noise-containing media emitted from a specific location within the source varies during operation and/or where the velocity of the media varies at different locations within the source.

The above described and many other features and attendant advantages of the present invention will become better understood by reference to the following detailed description when taken in conjunction with the accompanying drawings.

BRIEF DESCRIPTION OF THE DRAWINGS

FIG. 1 depicts an exemplary honeycomb acoustic structure which includes septum material with variable acoustic openings in accordance with the present invention.

FIG. 2 is a detailed view showing a single septum opening in accordance with the present invention that includes two flapper portions. The opening is shown in the static or low-flow position wherein surface area of the opening is at a minimum.

FIG. 3 is a detailed view of the same septum opening shown in FIG. 2, except that the flapper portions are shown in an open or high-flow position wherein the surface area of the opening is larger as compared to the opening in the static position as shown in FIG. 2

DETAILED DESCRIPTION OF THE INVENTION

Figure 12:
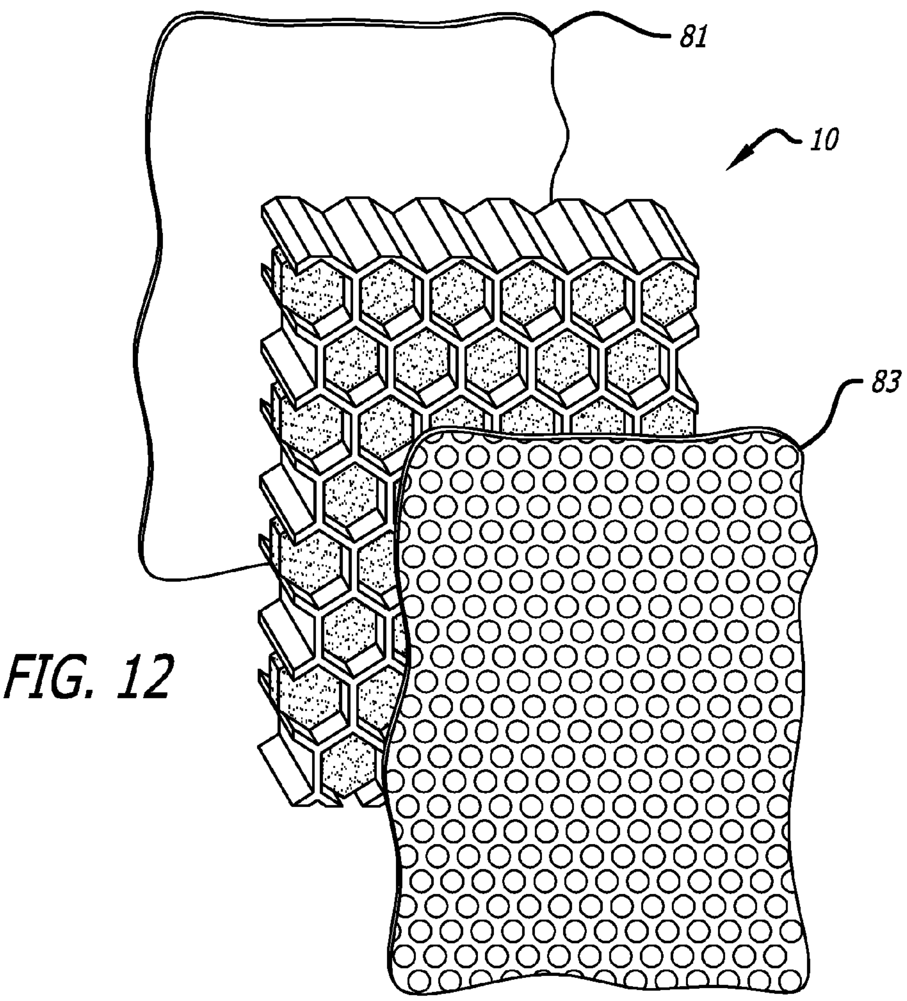
FIG. 12 is an exploded view showing an exemplary honeycomb acoustic structure, which includes septum material in accordance with the present invention, wherein the acoustic honeycomb is sandwiched between a solid backing sheet and a porous face sheet.
Figure 13:
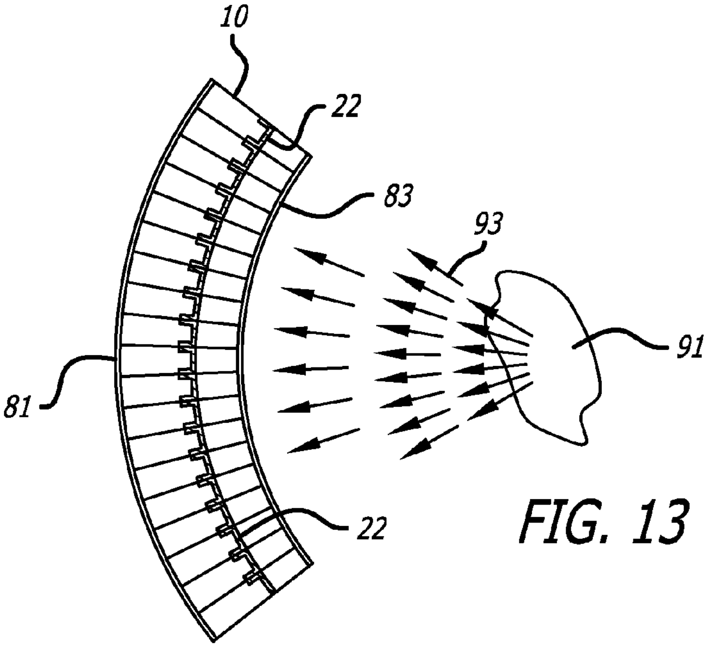
FIG. 13 is a simplified drawing showing the position of a portion of an engine nacelle located around a noise source, such as a jet engine.

An exemplary acoustic structure in accordance with the present invention is shown generally at 10 in FIGS. 1, 12 and 13. The acoustic structure 10 includes a honeycomb 12 having a first edge 14 which is to be located nearest the noise source and a second edge 16. The honeycomb 10 includes walls 18 that extend between the two edges 14 and 16 to define a plurality of cells 20. Each of the cells 20 has a depth (also referred to as the core thickness) that is equal to the distance between the two edges 14 and 16. Each cell also has a cross-sectional area that is measured perpendicular to the cell walls 18. The honeycomb can be made from any of the conventional materials used in making honeycomb panels including metals, ceramics and composite materials.

In accordance with the present invention, septums 22 having variable openings are located within the cells 20. It is preferred, but not necessary, that a septum 22 is located in most, if not all, of the cells 20. In certain situations, it may be desirable to insert the septums in only some of the cells to produce a desired acoustic effect. Alternatively, it may be desirable to insert two or more septums into a single cell.

In a preferred embodiment, the variable openings are located in septums 22 within a honeycomb structure 12. However, it is possible to locate the variable openings in a wide variety of other types of acoustic structures where attenuation of noise is required. For example, the invention can be used to form variable channels or openings between the cells of a low-frequency liner of the type described in U.S. patent application Ser. No. 13/466,232 filed May 8, 2012. The invention may also be used in the "drainage" section of acoustic structures where the flapper(s) remain closed or partially closed during normal operation to maintain desired acoustic dampening and open up when water contamination is present to provide a rapid and efficient way to remove the water contamination from the acoustic structure. The variable opening septums may also be used in combination with perforated sheets.

Any of the standard acoustic materials may be used to form the septums in accordance with the invention. These acoustic materials are typically provided as relatively thin sheets of material which are drilled or otherwise perforated to form the septum material. The sheets of acoustic material may be metal, ceramic or plastic. It is preferred that the septum material be sufficiently flexible so that the flapper portions, as described below, will bend in response to changes in flow velocity of noise-containing media and be capable of repeated flexing along the fold or bend line without failure. Septum material made from polyamide, polyester, polyethylene chlorotrifluoroethylene (ECTFE), ethylene tetrafluoroethylene (ETFE), polytetrafluoroethyloene (PTFE), polyphenylene sulfide (PPS), polyfluoroethylene propylene (FEP), polyether ether ketone (PEEK), polyamide 6 (Nylon, 6 PA6) and polyamide 12 (Nylon 12, PA12) are just a few examples. Fiber reinforcements may be added to the septum material to improve the ability of the material to withstand repeated flexing or movement of the flapper portions.

In the typical procedure for making septums, a sheet of septum material is mechanically or laser drilled to provide numerous holes through the material. These holes have a fixed diameter or shape which cannot be varied once the holes are formed. In accordance with the present invention, however, holes or openings are formed in the septum material wherein the size (surface area) of the opening is capable of varying automatically in response to changes in the velocity of noise-containing media passing through the septum. The term "noise-containing media" is intended to include air and other gases or liquids that carry noise. The septum openings of the present invention are especially well-suited for attenuating the noise in the variable velocity air and gas that is emitted from jet engines. Accordingly, septums utilizing openings as described below are particularly useful in nacelles for jet engines.

Figure 4:
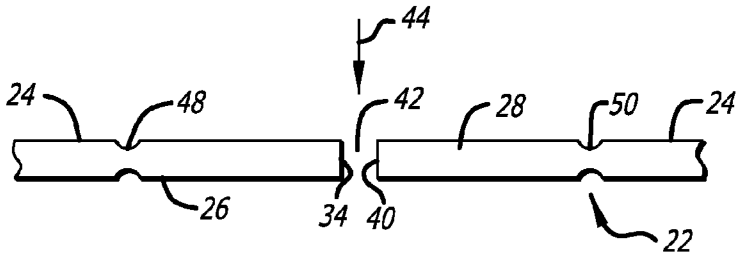
FIG. 4 is a side view of FIG. 2 which shows the position of the flapper portions relative to the plane of the main body of the septum when the flappers are in the static or low-flow position.

A small portion of an exemplary septum 22, which includes a single opening for demonstrative purposes, is shown in FIGS. 2-5. The septum 22 comprises a fixed portion 24 and movable flapper portions 26 and 28. Flapper portion 26 includes edges 30, 32 and 34. Flapper portion 28 includes edges 36, 38 and 40. The edges of the flapper portions 26 and 28 define an acoustic opening 42 through the septum 22. In FIGS. 2 and 4, the flapper portions 26 and 28 are shown in the static or closed position where the cross-sectional area of opening 42 is at a minimum. In this position, the flapper portions 26 and 28 are essentially coplanar with the fixed portion 24 of the septum 22 as shown in FIG. 4. The flapper portions 26 and 28 remain in the closed or static position when relatively low velocity noise-containing media is passed through the septum as represented by arrow 44. However, when the velocity of the noise-containing media increases, as shown by arrows 46 in FIG. 5, the flapper portions 26 and 28 automatically move in response to the increased velocity of the media so that the size or surface area of opening 42 increases.

Any number of hinge or connection arrangements is possible between the flapper portions 26 and 28 and fixed portion 24 of the septum 22 in order to provide movement of the flapper portions as shown in FIGS. 2-5. It is preferred that the flapper portions 26 and 28 be hinged to the fixed portion 24 of the septum 22 by way of fold lines 48 and 50, respectively. The fold lines 48 and 50 provide a transition between the fixed portion 24 of the septum 22 and the flapper portions 26 and 28. The fold lines 48 and 50 also determine the largest possible surface area for opening 42 when the flapper portions 26 and 28 move down to a position that is substantially perpendicular to the plane of the fixed portion 24 of septum 22.

Figure 6:
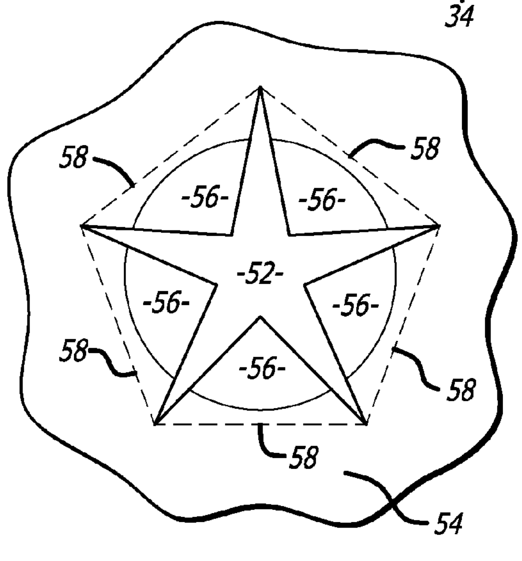
FIG. 6 is a top view of an exemplary septum opening which includes five flapper portions and fold lines which form a regular pentagon.
Figure 7:
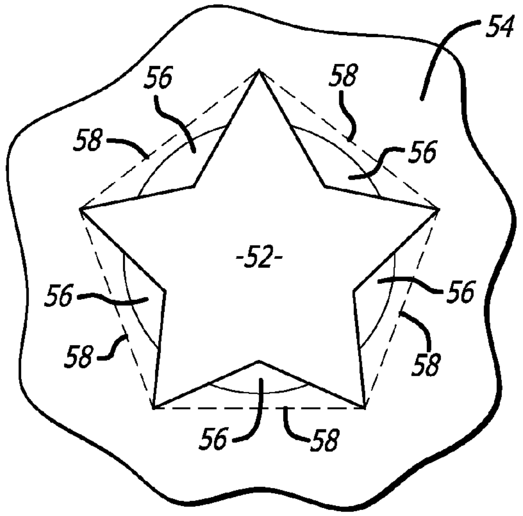
FIG. 7 is a top view of the same exemplary septum shown in FIG. 6 where the flapper portions are shown in a more open position where the surface area of the opening is increased in response to increased flow velocity of the noise-containing media.

An acoustic opening in the septum that includes two flapper portions is shown in FIGS. 2-5 for demonstrative purposes only. The variable surface area openings in accordance with the present invention may include, and be defined by, any number of flapper portions. For example, in FIGS. 6 and 7, five flapper portions 56 bend along fold lines 58 to form a variable surface area acoustic opening 52 in septum 54. As shown in FIG. 6, the flapper portions 56 are in a low-velocity position where the velocity of the noise-containing media is relatively low and the surface area or size of opening 52 is correspondingly relatively low. In FIG. 7, the flapper portions 56 are shown in a high-velocity position where the velocity of the noise-containing media has increased to a relatively high flow velocity and the size of opening 52 has actively and automatically increased in response to the increase in flow velocity of the noise-containing media.

Figure 8:
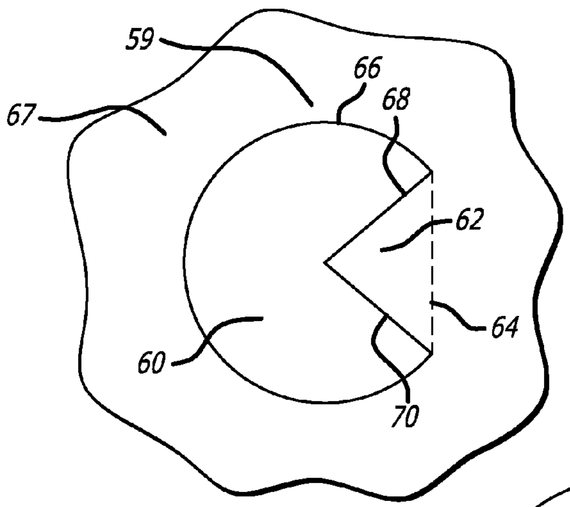
FIG. 8 is a top view of an exemplary septum opening which includes one flapper portion.

Another exemplary septum 59 that includes an actively variable acoustic opening 60 is shown in FIG. 8. The opening 60 includes one flapper portion 62 which is movable about hinge or fold line 64. The opening 60 is formed by surface 66 in the fixed portion 67 of the septum and edges 68 and 70 of the flapper portion 62. The minimum possible opening size is achieved when the flapper portion 62 is coplanar with the septum fixed portion 67. The maximum possible opening size is achieved when the flapper portion 62 is substantially perpendicular to the septum fixed portion 67. The maximum opening size is defined by surface 66 and fold or hinge line 64. The flapper portion 62 moves between the maximum opening size position and minimum opening size position in response to changes in the velocity of noise-containing media flowing through the opening 60.

Figure 9:
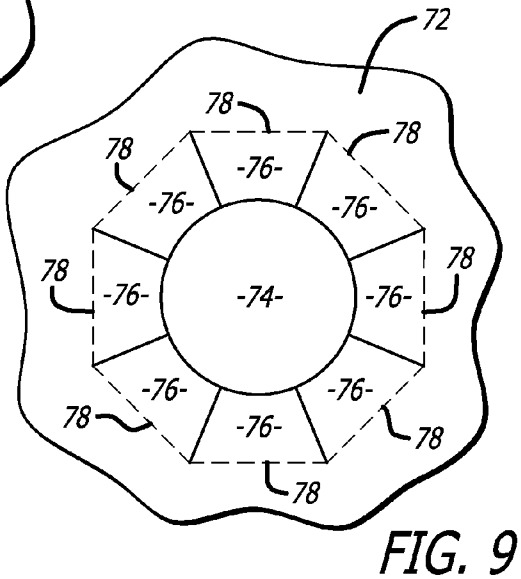
FIG. 9 is a top view of an exemplary septum opening which includes eight flapper portions and a fold lines which form a regular octagon. The eight flapper portions are shown in the static or closed position where the surface area of the septum opening is at a minimum.

Another exemplary septum 72 that includes an actively variable acoustic opening 74 is shown in FIG. 9. The opening 74 includes eight flapper portions 76 which are movable about hinge or fold lines 78. The flapper portions 76 are shown in the closed or static position where the minimum possible opening size is achieved because the flapper portions 76 are coplanar with the fixed portion of septum 72. The maximum possible opening size is achieved when the flapper portions 76 are bent so that they are substantially perpendicular to the fixed portion of septum 72. The maximum opening size is defined by fold or hinge lines 78 which form a regular octagon shaped opening. The flapper portions 76 move between the maximum opening size position and minimum open size position in response to changes in the velocity of noise-containing media flowing through the opening 74.

It should be noted that the flapper portions do bend independently of each other. In most situations, the flapper portions 76 will bend uniformly in response to changes in the velocity of the noise-containing media flowing through opening 74. In these situations, the flapper portions 76 will all be bent at approximately the same angle relative to the fixed portion of septum for a particular velocity of noise-containing media. However, the flapper portions 76 may also bend in a non-uniform manner due to intentional or unintentional variations in the resistance of the flapper portions to bending. In these situations, the flapper portions 76 may be bent at different angles relative to the fixed portion of septum 72 for any given velocity of noise-containing media. For example, the flapper portions in any given acoustic opening may be formed into different sizes and/or shapes so that they are bent to different angles by the same velocity of noise-containing media.

Figure 10:
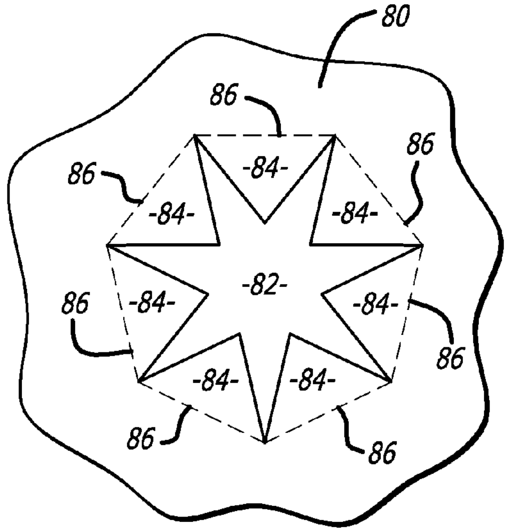
FIG. 10 is a top view of an exemplary septum opening which includes seven flapper portions and fold lines which form a regular heptagon. The seven flapper portions are shown in a position between the static or closed position and a fully open position.

Another exemplary septum 80 that includes an actively variable acoustic opening 82 is shown in FIG. 10. The opening 82 includes seven flapper portions 84 which are movable about hinge or fold lines 86. The flapper portions 84 are shown in a position where they are partially bent from the closed or static position where the minimum possible opening size is achieved because the flapper portions 84 are coplanar with the fixed portion of septum 80. The maximum possible opening size is achieved when the flapper portions 84 are bent so that they are substantially perpendicular to the fixed portion of septum 80. The maximum opening size is defined by fold or hinge lines 86 which form a regular heptagon shaped opening. The flapper portions 84 move between the maximum opening size position and minimum open size position in response to changes in the velocity of noise-containing media flowing through the opening 82.

Figure 11:
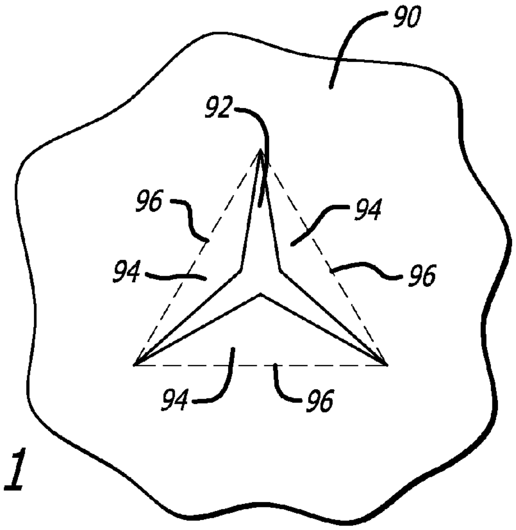
FIG. 11 is a top view of an exemplary septum opening which includes three flapper portions and fold lines which form a regular triangle. The three flapper portions are shown in a position between the static or closed position and a fully open position.

Another exemplary septum 90 that includes an actively variable acoustic opening 92 is shown in FIG. 11. The opening 92 includes three flapper portions 94 which are movable about hinge or fold lines 96. The flapper portions 94 are shown in a position where they are partially bent from the closed or static position where the minimum possible opening size is achieved because the flapper portions 94 are coplanar with the fixed portion of septum 90. The maximum possible opening size is achieved when the flapper portions 94 are bent so that they are substantially perpendicular to the fixed portion of septum 90. The maximum opening size is defined by fold or hinge lines 96 which form a regular triangle shaped opening. The flapper portions 94 move between the maximum opening size position and minimum open size position in response to changes in the velocity of noise-containing media flowing through the opening 82.

A wide variety of different septum materials may be used to form septums with actively variable openings in accordance with the present invention. Polyether ether ketone (PEEK) is a preferred septum material which has been widely used in making jet engine nacelles and other acoustic structures which are designed to operate at high temperatures and in a wide variety of environmental conditions. PEEK is a crystalline thermoplastic that can be processed to form sheets that are either in the amorphous or crystalline phase. Films typically have a thickness of from 0.001 to 0.012 inch. Compared to the crystalline PEEK films, amorphous PEEK films are more transparent and easier to thermoform. Crystalline PEEK films are formed by heating amorphous PEEK films to temperatures above the glass transition temperature ($T_g$) of the amorphous PEEK for a sufficient time to achieve a degree of crystallinity on the order of 30% to 35%. Crystalline PEEK films have better chemical resistance and wear properties than the amorphous films. The crystalline PEEK films are also less flexible and have more bounce-back than the amorphous film. Bounce-back is the force or bias that a folded film exerts towards returning to its original pre-folded (flat) shape.

Both crystalline and amorphous PEEK films may be used as septum materials provided that one takes into account the difference in flexibility and bounce-back between the two materials when designing the flapper portions. In general, a thicker film of amorphous PEEK is required to provide a flapper portion that has the same resistance to bending that is provided by a thinner crystalline film. For example, if a film of crystalline PEEK that is 0.002 inch thick is determined to have the required flexibility to provide the desired movement of the flapper portion(s) for a particular acoustic opening configuration, then one would need to consider using an amorphous film that is 0.003 inch thick or more in order to achieve the same degree of flexibility or resistance to bending.

Figure 5:
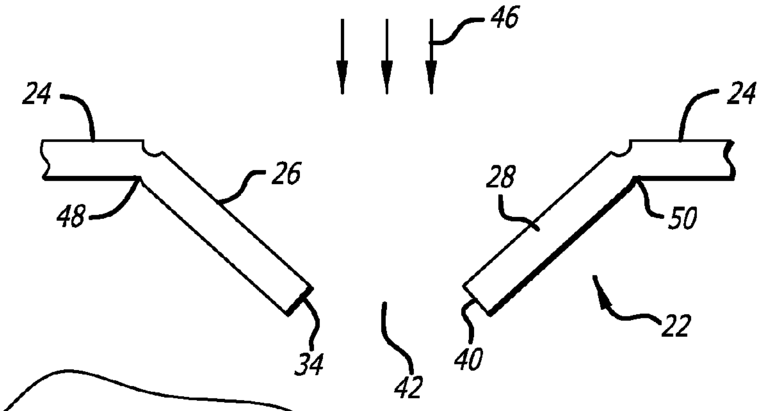
FIG. 5 is a side view of the FIG. 3 which shows the position of the flapper portions relative to the plane of the main body of the septum when the flappers are in an open or high-flow position.

In order to provide definite fold lines, the septum material may be embossed or otherwise formed to provide an indentation along the fold lines as shown at 48 and 50 in FIGS. 4 and 5. The embossed lines or indentations help to insure that the flapper portions bend along definite fold lines so that the maximum opening size is accurately controlled. The minimum surface area or hole size for an actively variable acoustic opening will vary depending upon the desired acoustic properties. The increase in surface area or hole size provided by bending of the flapper portions will also vary depending upon the desired acoustic properties. The maximum surface area or hole size for an actively variable acoustic opening, which is defined by the fold lines, will also vary depending upon the desired acoustic properties. The number of openings formed in the septum material will vary depending upon the minimum and maximum hole sizes and desired acoustic properties. It is preferred that the number of holes and hole size be selected to provide the Rayl value and the Non Linear Factor (NLF) required for the individual acoustic application.

The openings and flapper portions can be formed into the septum material by micro-machining and any other process that provides the desired flapper portions for a given opening It is preferred that the opening surfaces and flapper portions be formed using a laser that can accurately cut through the septum material to form multiple opening having a variety of flapper configurations.

Septum material, which includes actively variable acoustic openings in accordance with the present invention, is preferably used to make septums 22 which are inserted within the cells of a honeycomb 12 to provide an acoustic structure 10 which is typically sandwiched between a solid sheet 81 and a porous sheet 83 as shown in FIG. 12 to provide a final acoustic structure, such as a nacelle for a jet engine. A simplified view of a portion of a nacelle is shown in FIG. 13 where the jet engine is represented at 91 and the variable velocity noise-containing media is represented by arrows 93.

The septum material in accordance with the present invention can be cut or otherwise formed into individual septums or septum caps which may be inserted and bonded within a suitable honeycomb structure according to any of the conventional techniques for inserting and bonding septum material within honeycomb cells. For example, see published United States patent application US 2012-0037449 A1 and the patents cited therein for exemplary techniques for using acoustic septum materials to form septum caps which are inserted and bonded within honeycomb to provide an acoustic structure. The septum material of the present invention is not limited to the formation of individual septums or septum caps that are inserted into the cells of a honeycomb or other acoustic structure. For example, a sheet of septum material may be sandwiched between two honeycomb structures that are aligned so that septums are formed in the honeycomb cells that result from alignment of the two honeycomb structures.

As a feature of the present invention, it was discovered that using flapper portions to provide an automatic increase in the size of the acoustic openings in response to increases in flow velocity or rate of the noise-containing media provides a substantial reduction in NLF, as compared to septum material having fixed openings with the same percent open area (POA). POA is the ratio between the surface area of the openings or holes in the septum and the total area of the septum. The acoustic flow resistance or "Rayls" measured in centimeters, grams and seconds (cgs Rayls) of a septum is dependent upon the POA and thickness of the septum sheet. For example, a septum with a relatively high number of openings and a relatively high POA will typically have a relatively low acoustic flow resistance as compared to a septum that has the same thickness and opening sizes, but has relatively fewer holes resulting in a relatively lower POA.

Figure 14:
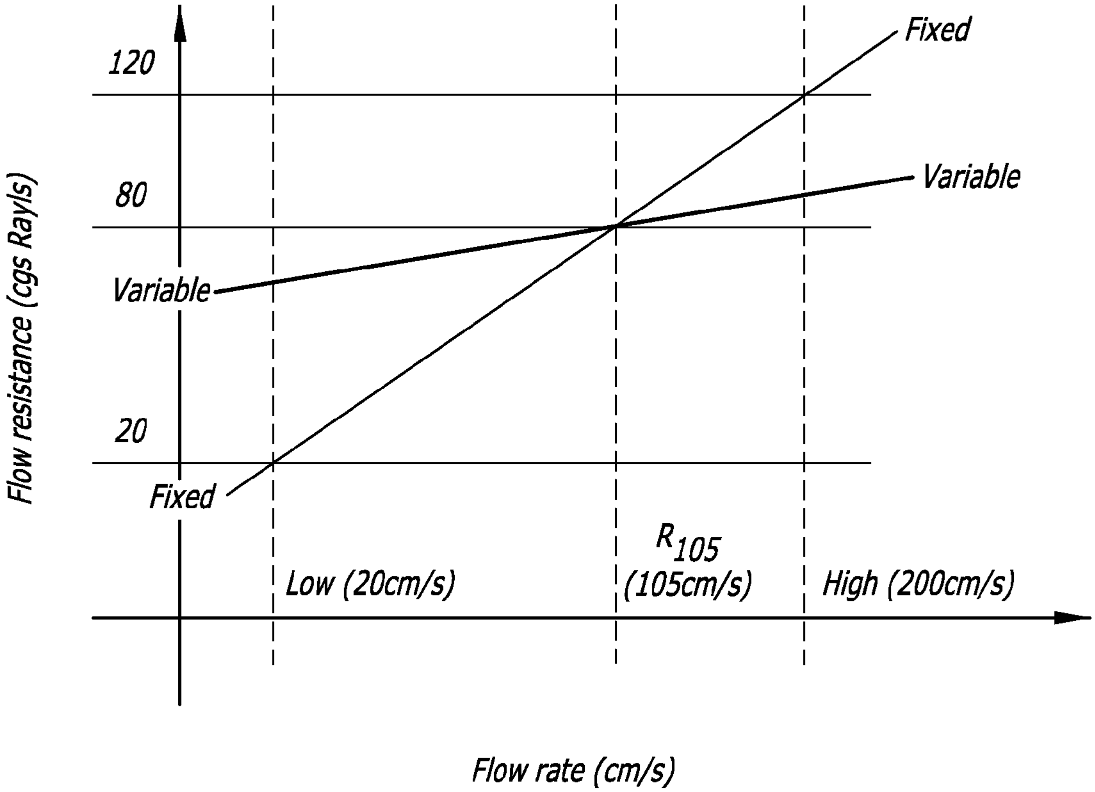
FIG. 14 is a graph that provides a comparison of the non-linearity factor (NLF) between septums with fixed openings and septums having actively variable openings in accordance with the present invention.

FIG. 14 is a graph which compares the expected acoustic flow resistance of an exemplary fixed opening septum and an exemplary variable opening septum at different flow rates or flow velocities of the noise-containing media. The fixed and variable septums are made from the same material, however, the initial POA of the variable opening septum is less than the POA of the fixed opening septum. The POA of the variable opening septum in accordance with the present invention automatically increases in response to increases in the flow rate or velocity. At low noise-containing media flow rates (20 cm/second), the fixed opening septum with a higher POA has a relatively low flow resistance of the around 20 cgs/Rayls. As the flow rate increases to a high level (200 cm/second) the flow resistance of the fixed opening septum increases to above 120 cgs/Rayls. The resulting NLF (200/20) is relatively high at approximately 6. In contrast, the variable septum opening with a lower POA has an initially higher low flow resistance of about 60 cgs/Rayls. However, the flow resistance only increases to about 90 cgs/Rayls when the flow rate of the noise-containing media is high. Accordingly, the NLF (200/20) is only 1.5, which is relatively close to the optimum goal of an NLF equal to 1.0. The actively variable septum openings of the present invention provide a simple and efficient substitute for fixed septum openings that produces acoustic septums that have substantially reduced NLF's.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. An acoustic structure comprising a septum having an acoustic opening that varies in size in response to changes in the velocity of noise-containing media passing through said acoustic opening, said acoustic structure comprising:

a septum comprising a fixed portion and one or more movable flapper portions that surround said acoustic opening wherein said one or more movable flapper portions are hinged to said fixed portion so that said one or more movable flapper portions move in order to vary the size of said acoustic opening in response to changes in the velocity of said noise-containing media passing through said acoustic opening.

2. An acoustic structure according to claim 1 wherein said movable flapper portion is hinged to said fixed portion by way of a fold line in said septum that forms a transition between said fixed portion of said septum and said flapper portion.

3. An acoustic structure according to claim 2 wherein a plurality of movable flapper portions surround said acoustic opening.

4. An acoustic structure according to claim 3 wherein said acoustic opening is surrounded by at least three flapper portions and wherein said fold lines form a regular polygon.

5. An acoustic structure according to claim 1 wherein said septum comprises a plurality of said acoustic openings.

6. An acoustic structure according to claim 1 wherein a plurality of movable flapper portions surround said acoustic opening.

7. An acoustic structure according to claim 1 wherein said structure comprises a honeycomb having a cell in which said septum is located.

8. A jet engine nacelle comprising an acoustic structure according to claim 7.

9. A method for making an acoustic structure comprising a septum having an acoustic opening that varies in size in response to changes in the velocity of noise-containing media passing through said acoustic opening, said method comprising the steps of:

providing a septum;

forming an acoustic opening through said septum, said septum comprising a fixed portion and one or more movable flapper portions that surround said acoustic opening, wherein said one or more movable flapper portions are hinged to said fixed portion so that said one or more movable flapper portions move in order to vary the size of said acoustic opening in response to changes in the velocity of said noise-containing media passing through said acoustic opening.

10. A method for making an acoustic structure according to claim 9 wherein said movable flapper portion is hinged to said fixed portion by way of a fold line in said septum that forms a transition between said fixed portion of said septum and said flapper portion.

11. A method for making an acoustic structure according to claim 10 wherein a plurality of said movable flapper portions surround said acoustic opening.

12. A method for making an acoustic structure according to claim 11 wherein said acoustic opening is surrounded by at least three flapper portions and wherein said fold lines form a regular polygon.

13. A method for making an acoustic structure according to claim 9 wherein a plurality of said acoustic openings is formed in said septum.

14. A method for making an acoustic structure according to claim 9 wherein a plurality of said movable flapper portions surround said acoustic opening.

15. A method for making an acoustic structure according to claim 9 which includes the additional step of securing said septum into a cell of a honeycomb to form an acoustic honeycomb structure.

16. A method for making a jet engine nacelle comprising the step of using the acoustic honeycomb structure of claim 15 to form at least a part of said jet engine nacelle.

17. A method of attenuating noise from a source wherein the velocity of noise-containing media emitted from said source is variable, said method comprising the step of locating an acoustic structure near said noise source, said acoustic structure comprising a septum having an acoustic opening that varies in size in response to changes in the velocity of said noise-containing media passing through said acoustic opening, said acoustic structure comprising:

a septum comprising a fixed portion and one or more movable flapper portions that surround said acoustic opening wherein said one or more movable flapper portions are hinged to said fixed portion so that said one or more movable flapper portions move in order to vary the size of said acoustic opening in response to changes in the velocity of said noise-containing media passing through said acoustic opening.

18. A method of attenuating noise from a source according to claim 17 wherein said acoustic structure comprises a honeycomb having a cell in which said septum is located to provide an acoustic honeycomb.

19. A method of attenuating noise from a source according to claim 18 wherein said acoustic honeycomb forms at least part of a nacelle for a jet engine.

* * * * *